United States Patent [19]
Schmucker

[11] 3,945,008
[45] Mar. 16, 1976

[54] ELECTRONIC PROXIMITY FUSE HAVING MULTIPLE DOPPLER FREQUENCY CHANNELS

[75] Inventor: Georg Schmucker, Ulm, Danube, Germany

[73] Assignee: Telefunken Patentverwertungs-G.m.b.H., Ulm, Danube, Germany

[22] Filed: Nov. 27, 1962

[21] Appl. No.: 240,475

[30] Foreign Application Priority Data
Nov. 29, 1961 Germany.............................. 21209

[52] U.S. Cl.............................. 343/7 PF; 102/70.2 P
[51] Int. Cl.².......................................... F42C 13/04
[58] Field of Search................... 102/70.2 R, 70.2 P; 343/7 ED, 8, 7.7, 14, 17.1 R, 7 PF; 325/33, 35

[56] References Cited
UNITED STATES PATENTS

| | | | |
|---|---|---|---|
| 2,952,735 | 9/1960 | Weiss | 325/33 |
| 2,994,060 | 7/1961 | Ross | 343/17.1 |
| 3,015,819 | 1/1962 | Thourel | 343/8.7 |
| 3,018,477 | 1/1962 | Brault | 343/7.7 |
| 3,046,892 | 7/1962 | Cosse et al. | 102/70.2 |
| 3,123,821 | 3/1964 | Huntoon | 343/7 PF |
| 3,131,388 | 4/1964 | Baker | 343/7 PF |
| 3,614,781 | 10/1971 | Lichtman | 343/7 PF |
| 3,821,737 | 6/1974 | Kalmus | 343/7 PF |

*Primary Examiner*—T. H. Tubbesing
*Attorney, Agent, or Firm*—Spencer & Kaye

EXEMPLARY CLAIM

1. A Doppler frequency responsive electronic proximity fuse comprising, in combination:

a. means for transmitting signals at at least two different frequencies and for receiving Doppler frequency signals which are reflected by a target;

b. means forming a first amplifier channel for amplifying only those Doppler frequency signals which are received when said transmitting-receiving means transmit at one of said two different frequencies;

c. means forming a second amplifier channel for amplifying only those Doppler frequency signals which are received when said transmitting-receiving means transmit at the other of said two different frequencies;

d. each of said amplifier channel means including an integrating stage and a threshold stage connected to the output of said integrating stage, so that each amplifier channel means produces an output signal only when the integrated Doppler frequency signal being amplified by the respective channel means exceeds a predetermined minimum amplitude, the integrating stage of at least one of said amplifier channel means being constituted by a filter circuit;

e. switch-over means connected to said transmitting-receiving means and to said first and second amplifier channel means for alternately causing (1) said transmitting-receiving means to transmit said one frequency and connecting said first amplifier channel means to the output of said transmitting-receiving means, and (2) said transmitting-receiving means to transmit said other frequency and connecting said second amplifier channel means to the output of said transmitting-receiving means; and f. coincidence circuit means connected to the outputs of said two amplifier channel means for producing a triggering signal only when both of said amplifier channel means apply an amplified signal to said coincidence circuit means.

22 Claims, 4 Drawing Figures

INVENTOR
Georg Schmucker

BY Spencer & Kaye
ATTORNEYS

ELECTRONIC PROXIMITY FUSE HAVING MULTIPLE DOPPLER FREQUENCY CHANNELS

The present invention relates to electronic proximity fuses.

More particularly, the present invention relates to an electronic proximity fuse of the type carried by an uncontrolled or remotely controlled projectile such as a shell or guided missile, which fuse operates on the Doppler principle and, upon reaching a certain point from the target, triggers an explosive charge. The projectile or missile itself may, for example, be shot from an artillery piece such as a gun or a mortar, or other high-angle firing device, or the projectile may be a missile launched under its own power.

There exist electronic proximity fuses which operate as follows:

A self-oscillating mixer stage emits a high frequency (HF) output of about 10 to 100 milliwatts via a small dipole antenna located at the front end of the projectile. When the projectile approaches a target, a receiver carried by the projectile will pick up a portion of the energy reflected by the target. This reflected signal, whose frequency will differ from that of the transmitted signal by the Doppler frequency, is mixed with the transmitted signal frequency, so as to produce a so-called beat frequency. This beat frequency will depend on the speed of the projectile carrying the detonator with respect to the target reflecting the energy picked up by the projectile. This beat frequency is amplified by a low frequency (LF) amplifier. The fuse can be set to respond, i.e., trigger the charge detonator, either at a particular beat frequency, or the trigger point can be fixed by a differentiating circuit. At present, the preferred arrangement is this: the point at which the Doppler frequency passes through zero is used as the determining beat frequency at which the fuse actuates the detonator. This is done because, as the projectile approaches the target, the Doppler frequency at first increases, or even first comes discernible from noise, after which the beat frequency will rapidly fall to zero, after which the frequency will very rapidly increase, after which the frequency will continue to decrease, or be lost in noise. This, then, means that the beat frequency will be most easily identifiable at the point at which the projectile is closest to the target.

One serious drawback of the above-described arrangement is that the enemy against whom the projectile is directed can, by means of electronic counter-measures involving the use of sensitive receivers, detect the transmitter frequency and activate a wobble transmitter which may be located ahead of the target and which, by transmitting a noise frequency near the frequency transmitted by the projectile, simulates the Doppler frequency, thereby prematurely triggering the detonator at a time when the projectile is not yet within effective striking distance. Such enemy action intended prematurely to activate the proximity fuse will hereinafter be referred to as "jamming."

According to one arrangement for reducing the vulnerability of the fuse to electronic counter-measures, the oscillator which generates the electromagnetic waves is equipped with means for continuously changing the frequency, wherein the average of the cyclically repeated transmitted frequencies is located outside of the range of the expected beat or Doppler frequency. The frequency variation can be linear, sinusoidal, triangular, or may follow any suitable function, as, for example, a non-periodic program obtained by means of sweep circuits producing the frequency control, which, in a statistically random manner, will be small deviations from the individual wobble periods, the term "wobble period" being the reciprocal repetition frequency of the transmitter frequency variation.

Existing proximity fuses respond as soon as the amplified voltage of the beat frequency reaches a given amplitude at the output of the LF amplifier. This has the great disadvantage that a noise frequency which gradually approaches the transmitter frequency likewise causes a beat frequency, thereby triggering the detonator before the projectile has even begun to approach a target.

The transmitter power of conventional electronic fuses is generally less than the power of enemy jamming transmitters. Also to be considered are the relative magnitudes of the field strengths of the useful and noise signals. On the one hand, the energy of the echo signal, i.e., the signal which is sent out by the fuse circuit and reflected by the target, shifted in frequency by an amount equal to the Doppler frequency, will be very low due to the fact that the usual target has a relatively small coefficient of reflection. On the other hand, the energy put out by an active target transmitter will be high. For example, the power output of an anti-aircraft shell is generally of the order of 10 milliwatt, while the power output of the usual jamming transmitter carried aboard an aircraft is of the order of 100 watts or higher. For this reason alone, conventional anti-jamming measures have been found to be unsatisfactory. A jamming frequency of relatively high power which approaches the average transmitter frequency of the proximity fuse will, despite the above-mentioned anti-jamming means, produce a sufficiently great Doppler frequency amplitude, i.e., an amplitude which will be sufficient to trigger the fuse. Nor has it been found particularly effective to prevent this by using integrator circuits which delay triggering of the fuse until a plurality of beat frequency oscillations have occurred, inasmuch as jamming transmitters often have follow-up devices, and operate with broad-band signals and frequency wobbling.

Another type of proximity fuse incorporates two parallely connected input filters, one a low-pass filter and the other one a high-pass filter, to which the beat frequency is applied. The output of both filters are connected to rectifiers whose outputs, in turn, are connected to respective coils of a polarized relay. The fixed contacts of the relay are connected to a voltage source and to the trigger coil, respectively, while the movable contact is connected to a capacitor. When the fuse approaches a target, as, for example, an aircraft, the beat frequency falls off rapidly while the amplitude will rapidly increase until the minimum beat frequency is reached at the point at which the fuse is closest to the target. The fuse is thus made ready for triggering by the beat frequency whose amplitude increases rapidly as the fuse approaches the target, while the actual trigger signal does not occur until the beat frequency has fallen below a certain value. As the projectile approaches the aircraft, the relay is first energized via the high-pass filter, and then via the low-pass filter when the projectile is nearest to the craft. The armature contact moves out of its middle rest position first to the voltage contact, thereby causing the capacitor to be charged up, and then to the contact connected to the fuse triggering coil. In this way, the charge on the capacitor is applied to the trigger coil, thereby causing the triggering action. Experience has shown, however, that this type of arrangement, too, is not sufficiently jam-proof when the fuse is exposed to wobbletype jamming transmission.

It is, therefore, a basic object of the present invention to provide an electronic proximity fuse which is free of the jamming sensitivity of the above-described fuse arrangements, which fuse itself is light in weight and of simple construction, and usable in projectiles fired by such artillery pieces as guns, mortars or howitzers, in launched projectiles such as guided missiles and rockets, in land and sea mines, in aircraft-borne projectiles, such as bombs, and in marine projectiles, such as torpedoes.

With the above object in view, the present invention resides basically in an electronic proximity fuse which operates on the Doppler principle and which, for purposes of rendering the fuse less vulnerable to jamming, uses at least two transmitting frequencies which are switched on alternatively in accordance with any desired program, there being incorporated in the amplifier for the Doppler frequency signal means for automatically triggering the fuse when, as the projectile carrying the fuse approaches the target, the amplitude of a Doppler frequency signal of predetermined maximum frequency reaches a predetermined minimum value. According to the present invention, the input of the fuse has a plurality of amplifier channels equal in number to the number of transmitter frequencies, which amplifiers amplify the Doppler frequency signals pertaining to each respective transmitter frequency. Furthermore, there are means synchronized with the switching of the transmitter frequency which switch the individual amplifier channels in such a manner that each amplifier channel will amplify only those Doppler frequency signals which are attributable to the particular transmitter frequency to which the channel pertains. Moreover, the fuse includes a logic circuit which is connected to the outputs of all of the amplifier channels, via integrating and threshold stages, which logic circuit puts out a signal that causes automatic triggering of the fuse when the Doppler frequency signals in each amplifier channel, integrated over several switched-on periods of the individual amplifier channels, reach predetermined minimum amplitudes.

According to another embodiment of the present invention, the fuse circuit is so arranged that the triggering signal is produced when the algebraic sign, or phase, of the Doppler frequency changes, which occurs when the Doppler frequency goes through zero at the instant that the projectile carrying the fuse is closest to the target. Since even a wobble generator cannot simulate such a change of algebraic sign, the fuse is even more jam-proof than the first-described embodiment, so much so that it is even possible to do without the change-over from one frequency to another, i.e., the fuse circuit can be designed in such a manner that the transmitter will operate at but a single frequency. A circuit relying on the phase change of the Doppler frequency will, in practice, incorporate a delay member in one of the amplifier channels so that the Doppler frequency signal in that one channel will still be of the same phase it was when the projectile approached the target, at a time when the Doppler frequency signal in the other channel will already be of the opposite phase. This phase difference is detected by a suitable phase discriminator which thereupon puts out the triggering signal.

Additional objects and advantages of the present invention will become apparent upon consideration of the following description when taken in conjunction with the accompanying drawings in which.

Figure 1:
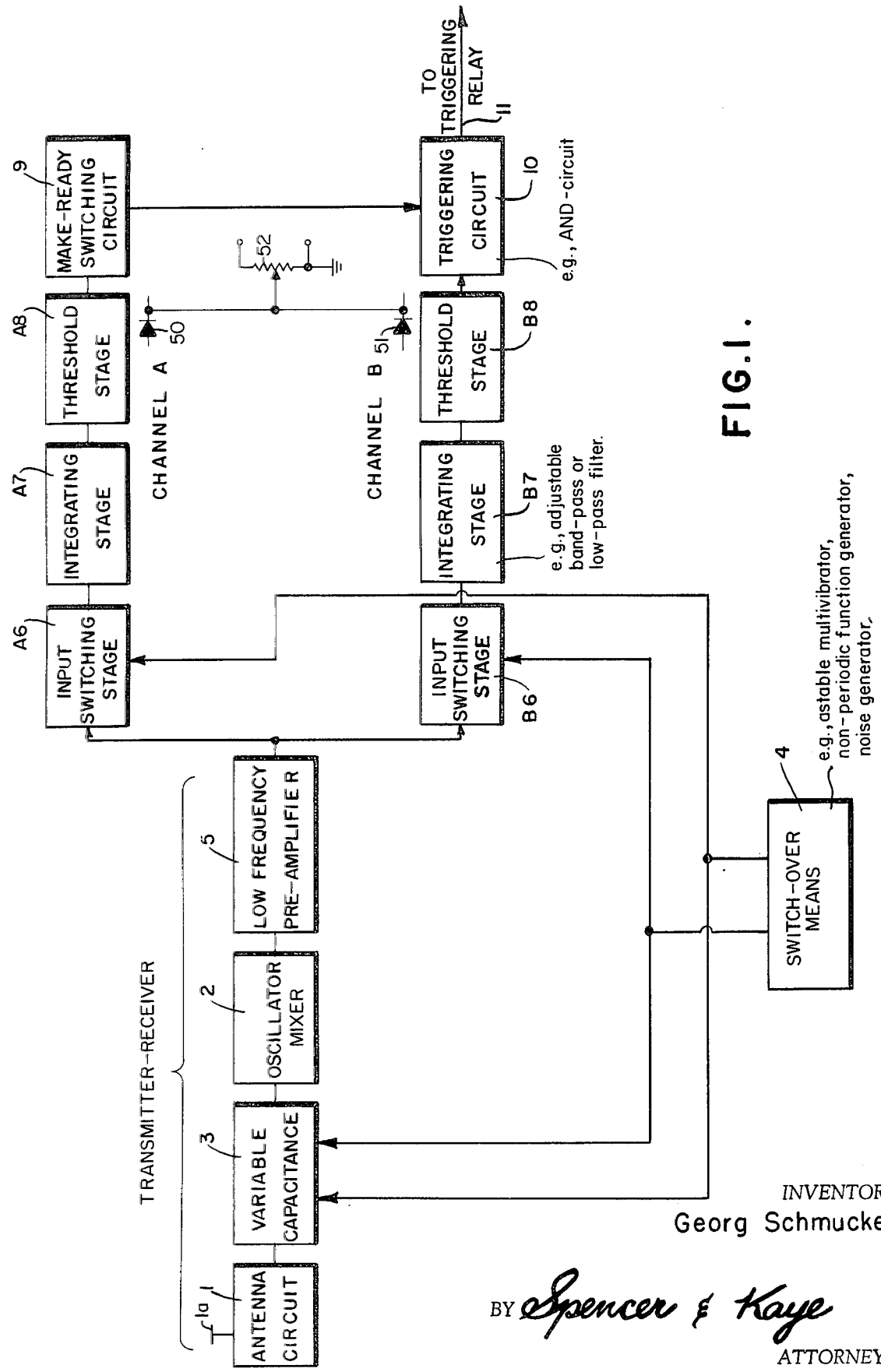
FIG. 1 is a block diagram of one embodiment of an electronic proximity fuse according to the present invention.

Referring now to the drawings and FIG. 1 thereof in particular, the same shows an electronic proximity fuse particularly suited for use against flying targets and incorporating a transmitter-receiver having an antenna circuit 1, constituted, for example, by a magnetic ferrite dipole antenna 1a built into the head of the projectile. The antenna circuit transmits a signal having a frequency generated by a self-oscillating mixer stage 2, the power output of the antenna being approximately 10 to 100 milliwatt. Interposed between the antenna circuit 1 and the mixer stage 2 is a variable switching capacitor 3 constituted, for example, by a capacitance diode. This capacitor 3 is connected to the output of an astable multivibrator 4 so that the transmitted frequency is varied, in relatively rapid sequence, in accordance with the output signal of this multivibrator 4. The energy reflected by the target is received and is mixed with a portion of the transmitted energy and amplified by an LF pre-amplifier 5.

Assuming there to be two transmitted frequencies, the output of the amplifier 5 is fed to two parallely connected Doppler frequency amplifier channels A and B. These channels can, of course, be separate channels insofar as high frequencies are concerned as well, for instance, the channels can have their own respective mixer stages. The number of channels corresponds to the number of transmitter frequencies which are used, which frequencies are changed over in a preferably periodic manner. In order to make certain that each channel will receive only those Doppler frequencies which pertain to the particular transmitter frequency of the channel, the input of each channel includes a switching stage A6, B6, which stages are themselves switched by the multivibrator 4 at the same rate at which the transmitter frequencies are switched, so that the channel A will always be utilized when the apparatus operates at transmitter frequency A and channel B will be utilized when the transmitter operates at frequency B. The outputs of the switching stages A6, B6, are connected to integrating circuits A7, B7, respectively, consisting, for example, of low-pass or band-pass filters whose cut-off frequencies can be adjusted. The individual signal blocks caused by the switching stages A6, B6, are thus integrated. The upper cut-off frequency of these filter circuits will be above the maximum Doppler frequency to be utilized, but below the switching frequency of the multivibrator 4. Inasmuch as relatively low frequencies are to be integrated by small and lightweight components, the integrating circuits can be constituted by known means, namely, integrating stages incorporating electronic tubes connected to operate as reactance tubes, or semiconductor circuits operating as capacitances or inductances.

The outputs of the integrating circuits A7, B7, are connected to respective threshold stages A8, B8, which are preferably of the adjustable type. For example, the stages A8, B8, comprise variable capacitances 50, 51, which are connected to a common bias means constituted by an adjustable voltage source 52. When the integrated signal reaches a predetermined amplitude, the stages A8, B8, will pass a suitable signal on to the respective switching circuits 9 and 10. Here it will be noted that the distance from the target at which the fuse circuit is caused to trigger the detonator can be set by adjusting the integrating circuits and the thresholds of the threshold elements A8, B8. The switching circuit 9 is a so-called make-ready circuit while circuit 10 is a triggering circuit in the form of an AND-circuit one of whose inputs is, as mentioned above, connected to the output of threshold stage B8, while the other input is connected to the output of circuit 9. The latter will, of course, deliver a signal as soon as it receives a signal from the threshold stage A8, while the firstmentioned input of AND-circuit 10 will not be energized until the threshold to which stage B8 is set is reached. The output of AND-circuit 10 is connected, via a line 11, to the trigger relay (not shown).

It will be appreciated that the detonator will be triggered only when 1. the beat frequency pertaining to transmitter frequency A appears in channel A over a sufficiently long period of time, corresponding to a certain number of individual switching phases, to cause the voltage in integrator circuit A7 to exceed the threshold value to which element A8 is set, thereby actuating the switching circuit 9 which, in turn, applies a signal to one of the two inputs of AND-circuit 10, thereby "opening," in a manner of speaking, channel B,
and 2. the beat frequency pertaining to transmitter frequency B appears in channel B over a sufficiently long period of time, corresponding to a certain number of individual switching phases, to cause the voltage in integrator circuit B7 to exceed the threshold value to which element B8 is set, thereby making it possible for a trigger signal to be applied to one of the two inputs of AND-circuit 10 while the latter has the other input activated by switching circuit 9.

It can be expected, with a high degree of probability, that an enemy wobble transmitter will be able to simulate but one of the two frequencies A and B, particularly if these two frequencies differ substantially from each other, this being made possible by the fact that conventional fuse antennas are able to operate over a wide band width. If, nevertheless, the wobble transmitter were to scan a frequency spectrum sufficiently large to encompass both frequencies A and B, it can still be expected, again with a high degree of probability, that the transit time of the jamming spectrum, at any one frequency, will not be sufficiently great to allow the integrating stages of the various channels to form output voltages equal to the threshold voltage of the corresponding threshold elements. Moreover, if the jamming is to be effective, not only would the jamming transmitter have to produce the correct frequencies, but also, the jamming transmitter would have to switch between the frequencies at the same rate at which the multivibrator 4 operates.

The operational security of the proximity fuse can readily be increased by increasing the number of transmitting frequencies and, of course, the number of Doppler frequency amplifier channels. In that case, the AND-circuit serving as the triggering circuit will be modified to include more than two inputs so that it will produce no output signal for triggering the firing relay unless and until all of the inputs are energized by command signals coming from each of the respective channels.

Yet another way in which the proximity fuse can be rendered even more jam-proof is to provide means for switching the capacitor 3, and, of course, the respective channels, in a non-periodic manner. This can be done by providing a random function, or quasi-random function generator, as, for example, a noise generator which controls the switching of the capacitor 3 and the channels.

In practice, the integrator and threshold stages will be set so that the fuse detonates the charge shortly before the projectile is at its closest point to the target.

Figure 2:
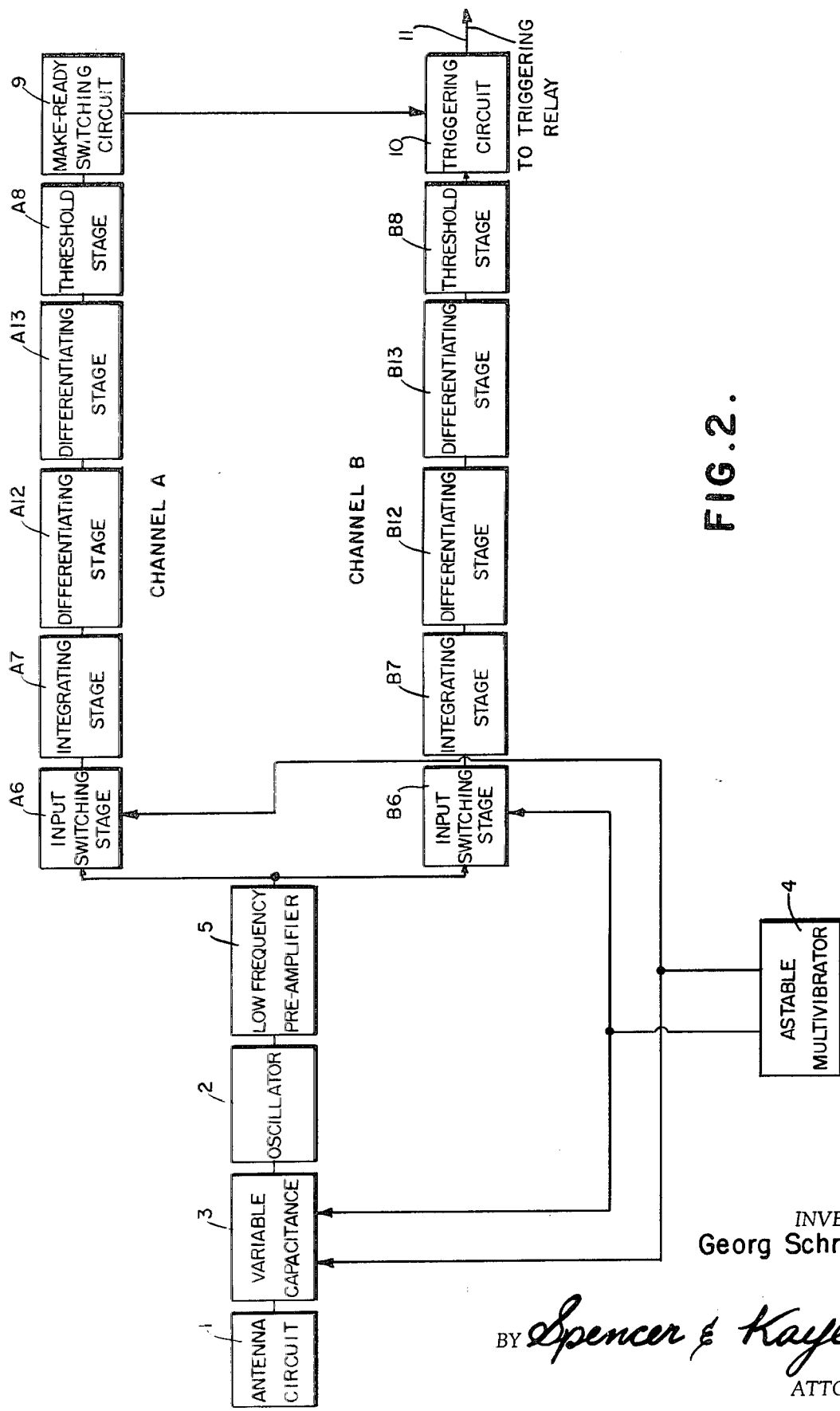
FIG. 2 is a block diagram similar to the circuit of FIG. 1 but shows additional components.

The electronic proximity fuse shown in FIG. 2 is particularly suited for use in air-to-ground projectiles, such as bombs. The fuse incorporates the same components as described in FIG. 1; in addition, each channel includes one or more differentiating stages A12, A13, B12, B13, interposed between the integrating and threshold stages. By differentiating the output of the integrating stage, the rate at which the Doppler frequency increases as the projectile approaches the target is increased.

Figure 3:
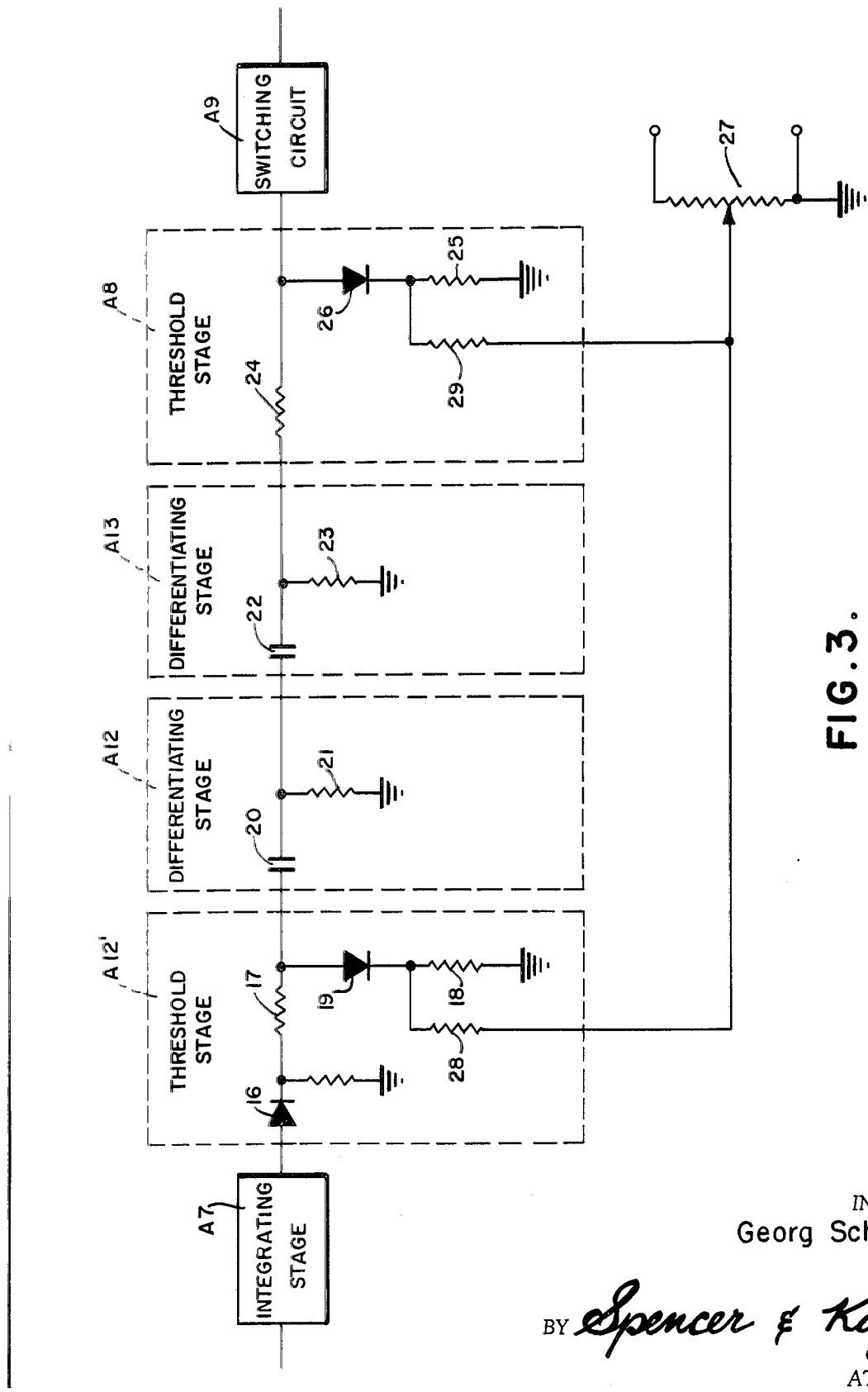
FIG. 3 is a circuit diagram showing a detail.

In many cases it is expedient to limit the amplitude at a point ahead of the differentiating stages, which amplitude limiting is controlled by the same setting voltage that sets the threshold stage 8. Such an arrangement is illustrated in FIG. 3 which shows the details of certain ones of the components incorporated in channel A of the circuit of FIG. 2, namely, the differentiating stages A12, A13, and the adjustable threshold stage A8 interposed between the integrating stage A7 and the make-ready switch A9. The output signal of integrating stage A7 is applied to a second threshold or amplitude limiting circuit A12' incorporating a rectifier 16 and resistor 17 and the actual limiting element composed of a resistor 18 and a diode 19, the output of this threshold circuit being applied to the first differentiating stage A12 constituted by a capacitor 20 and a grounded resistor 21. As stated above, the slope of the Doppler frequency curve can be increased by means of the second differentiating stage A13 which, as shown in FIG. 3, incorporates an RC circuit made up of a capacitor 22 and a resistor 23. The thus differentiated signal is applied, via a resistor 24 forming part of the threshold stage A8, to the limiting circuit composed of a resistor 25 and a diode 26, the thus limited signal being applied to switching circuit A9. The bias of the limiting diodes 19, 26, is applied, via decoupling resistors 28, 29, from a common adjustable voltage source 27.

The corresponding elements of channel B will be similarly constituted.

Figure 4:
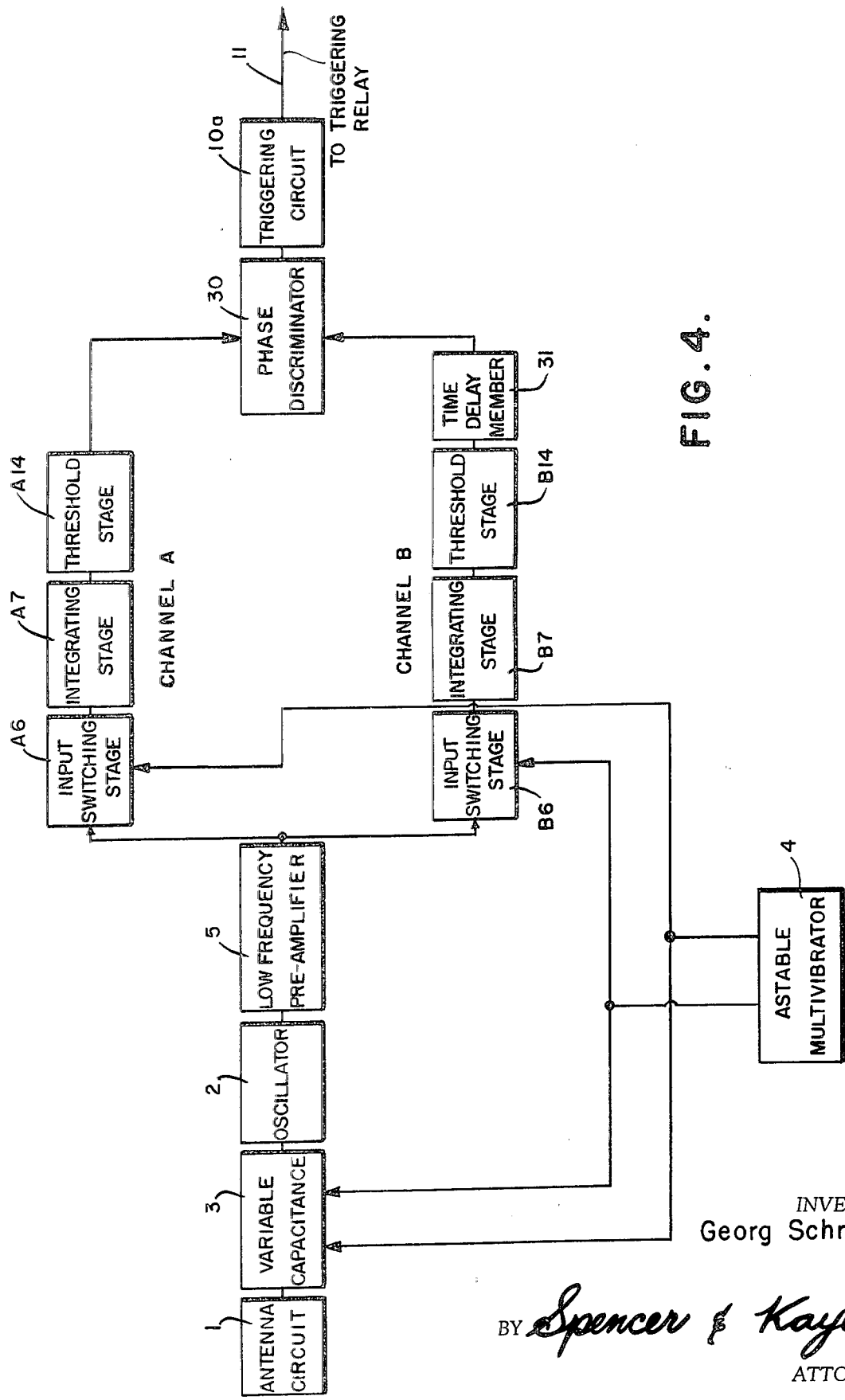
FIG. 4 is a block diagram of another embodiment of an electronic proximity fuse according to the present invention.

The circuit shown in FIG. 4 is basically similar to that of FIG. 1 and is likewise suited for use against flying targets. Similar reference numerals are used to identify the same components as are used in the circuit of FIG. 1. However, the circuit of FIG. 4 differs from that of FIG. 1 in that, in order to render the proximity fuse even more jam-proof against electronic counter-measures, the fuse is not triggered when the Doppler frequency reaches given threshold values in stages A8 and B8, instead, the fuse is triggered when the algebraic sign of the blocks of Doppler frequency signals changes, which occurs when the Doppler frequency goes through zero at the instant that the fuse is closest to the target. A wobble transmitter can not simulate such a change of algebraic sign, so that the proximity fuse according to FIG. 4 is the most jam-proof of all of the heretofore described embodiments.

In the circuit according to FIG. 4, the output voltage of the integrating stage A7 is applied, via the limiting circuit A14 if desired, to one input of a phase discriminator 30, the other input of which is connected to channel B, which may likewise incorporate a limiting circuit B14, connected to the output of the integrating stage B7. Additionally, channel B incorporates a delay member 31 which delays the signal in channel B by a timer interval which is of the order of several milliseconds. As soon as the fuse is at its closest point near the target, the Doppler frequency becomes zero and immediately thereafter commences to increase in the opposite direction, i.e., the Doppler frequency will, after the closest point has been reached, be related to the transmitted signal in an algebraic direction which is opposite to the direction or phase in which the Doppler frequency was related to the transmitted frequency while the projectile carrying the fuse approached the target. Therefore, the output of channel A will deliver a signal indicative of the opposite phase position of the Doppler frequency while the output of channel B will, due to the delay member 31, still produce an output signal indicative of the original phase. The phase discriminator 30 will respond to this phase difference being fed to it by the two channels A and B and deliver a command signal to the triggering circuit 10a which, in the instant embodiment, will, of course, have but one input.

In view of the fact that the circuit of FIG. 4 is particularly jam-proof, it is possible to do without the change-over from one frequency to another, in which case components 3, 4 A6 and B6, A7 and B7 can be dispensed with and the entire system be operated at but a single transmitter frequency. This, of course, substantially simplifies the circuit.

The various active elements, i.e., switching elements and/or reactance elements in all of the components, may be constituted by transistors, semiconductor elements, or tunnel diodes.

Heretofore, it was customary to connect the proximity fuse circuits to dipole-type antennas, the latter being dimensioned according to the size of the projectile. According to a further feature of the present invention, the antennas may be constituted by magnetic antennas, for example, suitably shaped ferrite rod antennas, as a result of which the antenna design can be independent of the projectile; at the same time, it is simple to obtain the desired directivity pattern.

It will be understood that the above description of the present invention is susceptible to various modifications, changes, and adaptations, and the same are intended to be comprehended within the meaning and range of equivalents of the appended claims.

What is claimed is:

1. A Doppler frequency responsive electronic proximity fuse comprising, in combination:

a means for transmitting signals at at least two different frequencies and for receiving Doppler frequency signals which are reflected by a target;

b means forming a first amplifier channel for amplifying only those Doppler frequency signals which are received when said transmitting-receiving means transmit at one of said two different frequencies;

c means forming a second amplifier channel for amplifying only those Doppler frequency signals which are received when said transmitting-receiving means transmit at the other of said two different frequencies;

d each of said amplifier channel means including an integrating stage and a threshold stage connected to the output of said integrating stage, so that each amplifier channel means produces an output signal only when the integrated Doppler frequency signal being amplified by the respective channel means exceeds a predetermined minimum amplitude, the integrating stage of at least one of said amplifier channel means being constituted by a filter circuit;

e switch-over means connected to said transmitting-receiving means and to said first and second amplifier channel means for alternately causing (1) said transmitting-receiving means to transmit said one frequency and connecting said first amplifier channel means to the output of said transmittingreceiving means, and (2) said transmitting-receiving means to transmit said other frequency and connecting said second amplifier channel means to the output of said transmitting-receiving means; and f coincidence circuit means connected to the outputs of said two amplifier channel means for producing a triggering signal only when both of said amplifier channel means apply an amplified signal to said coincidence circuit means.

2. A proximity fuse as defined in claim 1 wherein said filter circuit is an adjustable band-pass filter.

3. A proximity fuse as defined in claim 1 wherein said filter circuit is an adjustable low-pass filter.

4. A Doppler frequency responsive electronic proximity fuse comprising, in combination:

a means for transmitting signals at at least two different frequencies and for receiving Doppler frequency signals which are reflected by a target;

b means forming a first amplifier channel for amplifying only those Doppler frequency signals which are received when said transmitting-receiving means transmit at one of said two different frequencies;

c means forming a second amplifier channel for amplifying only those Doppler frequency signals which are received when said transmitting-receiving means transmit at the other of said two different frequencies;

d each of said amplifier channel means including an integrating stage and a threshold stage connected to the output of said integrating stage, so that each amplifier channel means produces an output signal only when the integrated Doppler frequency signal being amplified by the respective channel means exceeds a predetermined minimum amplitude, the threshold stage of at least one of said amplifier channel means being adjustable;

e switch-over means connected to said transmittingreceiving means and to said first and second amplifier channel means for alternately causing (1) said transmitting-receiving means to transmit said one frequency and connecting said first amplifier channel means to the output of said transmittingreceiving means and (2) said transmitting-receiving means to transmit said other frequency and connecting said second amplifier channel means to the output of said transmitting-receiving means; and f coincidence circuit means connected to the outputs of said two amplifier channel means for producing a triggering signal only when both of said amplifier channel means apply an amplified signal to said coincidence circuit means.

5. A Doppler frequency responsive electronic proximity fuse comprising, in combination:
   a. means for transmitting signals at at least two different frequencies and for receiving Doppler frequency signals which are reflected by a target;
   b. means forming a first amplifier channel for amplifying only those Doppler frequency signals which are received when said transmitting-receiving means transmit at one of said two different frequencies;
   c. means forming a second amplifier channel for amplifying only those Doppler frequency signals which are received when said transmitting-receiving means transmit at the other of said two different frequencies;
   d. each of said amplifier channel means including an integrating stage and a threshold stage connected to the output of said integrating stage, so that each amplifier channel means produces an output signal only when the integrated Doppler frequency signal being amplified by the respective channel means exceeds a predetermined minimum amplitude, at least one of said amplifier channel means further including at least one differentiating stage interposed between its integrating and threshold stages;
   e. switch-over means connected to said transmitting-receiving means and to said first and second amplifier channel means for alternately causing (1) said transmitting-receiving means to transmit said one frequency and connecting said first amplifier channel means to the output of said transmittingreceiving means and (2) said transmitting-receiving means to transmit said other frequency and connecting said second amplifier channel means to the output of said transmitting-receiving means; and
   f. coincidence circuit means connected to the outputs of said two amplifier channel means for producing a triggering signal only when both of said amplifier channel means apply an amplified signal to said coincidence circuit means.

6. A proximity fuse as defined in claim 5 wherein said one amplifier channel includes a further threshold stage interposed between said integrating and differentiating stages.

7. A proximity fuse as defined in claim 6 wherein said threshold stages are adjustable and are connected to a common adjustable voltage source.

8. A Doppler frequency responsive electronic proximity fuse comprising, in combination:
   a means for transmitting signals at a plurality of frequencies and for receiving Doppler frequency signals which are reflected by a target, said transmitting-receiving means comprising an antenna circuit, a variable capacitance connected to said antenna circuit, a mixer stage connected to said variable capacitance, and a low-frequency amplifier connected to the output of said mixer stage;
   b means forming a plurality of amplifier channels corresponding in number to the number of frequencies at which said transmitting-receiving means operate, each amplifier channel pertaining to a respective one of said plurality of frequencies and amplifying only those Doppler frequency signals which are received when said transmitting-receiving means transmit at the particular frequency to which the respective amplifier channel pertains, each amplifier channel including an integrating stage and a threshold stage connected to the output of said integrating stage so that each respective amplifier channel produces an output signal only when the integrated Doppler frequency signal being amplified exceeds a predetermined minimum amplitude, each of said amplifier channels further including an input switching stage connected to the output of said low-frequency amplifier, said integrating stage being connected to the output of said switching stage;
   c switch-over means connected to said transmittingreceiving means and to said plurality of amplifier channels for causing said transmitting-receiving means sequentially to transmit different ones of said plurality of said frequencies and simultaneously connecting to said transmitting-receiving means the particular one of said plurality of amplifier channels which pertains to the respective frequency being transmitted at any given instant, said switch-over means comprising a circuit element connected to said variable capacitance and to said input switching stages for tuning said capacitance to a value which will cause said transmitting-receiving means to transmit at the one of said frequencies and simultaneously activating the input switching stage of the particular amplifier channel which pertains to the frequency at which said transmitting-receiving means is tuned to operate; and
   d coincidence circuit means connected to the outputs of said amplifier channels for producing a trigger signal only when all of said amplifier channels apply an amplified signal to said coincidence circuit means, said coincidence circuit means comprising an AND-circuit whose inputs are connected to the outputs of said amplifier channels.

9. A proximity fuse as defined in claim 8 wherein at least one of said amplifier channels further comprises at least one differentiating stage interposed between said integrating and threshold stages.

10. A proximity fuse as defined in claim 9 wherein said one amplifier channel further comprises a second threshold stage interposed between said integrating and differentiating stages.

11. A proximity fuse as defined in claim 10 wherein said two threshold stages comprise variable capacitances, and wherein common bias means are connected to both of said last-mentioned capacitances.

12. A proximity fuse as defined in claim 8 wherein said switch-over means comprise an astable multivibrator.

13. A proximity fuse as defined in claim 8 wherein said switch-over means comprise a non-periodic function generator.

14. A proximity fuse as defined in claim 8 wherein said switch-over means comprise a noise generator.

15. A proximity fuse as defined in claim 8 wherein said antenna circuit comprises a magnetic ferrite rod antenna.

16. A Doppler frequency responsive electronic proximity fuse comprising, in combination:

a means for transmitting signals at at least two different frequencies and for receiving Doppler frequency signals which are reflected by a target;

b. means forming a first amplifier channel for amplifying only those Doppler frequency signals which are received when said transmitting-receiving means transmit at one of said two frequencies;

c. means forming a second amplifier channel for amplifying only those Doppler frequency signals which are received when said transmitting-receiving means transmit at the other of said two different frequencies, said second amplifier channel including a time delay stage;

d. switch-over means connected to said transmitting-receiving means and to said first and second amplifier channel means for alternately causing (1) said transmitting-receiving means to transmit said one frequency and connecting said first amplifier channel means to the output of said transmittingreceiving means and (2) said transmitting-receiving means to transmit said other frequency and connecting said second amplifier channel means to the output of said transmittingreceiving means; and e. a phase discriminator stage connected to the outputs of said two amplifier channel means for producing a triggering signal only when the Doppler frequency signal outputs produced by said two amplifier channel means are of opposite phase.

17. A Doppler frequency responsive electronic proximity fuse comprising, in combination:

a means for transmitting a high frequency signal and for receiving Doppler frequency signals which are reflected by a target;

b means forming at least two amplifier channels, one of which incorporates a time delay member;

c switch-over means connected to said amplifier channels for alternately connecting the same to said transmittingreceiving means; and d output circuit means connected to the outputs of said amplifier channels for producing a triggering signal only when the output signals produced by said two amplifier channels fulfill a predetermined condition, said output circuit means comprising a phase discriminator stage which produces said triggering signal only when the Doppler frequency signals amplified in said channels are of the opposite phase.

18. A proximity fuse as defined in claim 17 wherein said transmitting-receiving means transmits at but one frequency and said amplifier channels are able to amplify Doppler frequency signals received when said transmitter-receiver operates at said one frequency.

19. A proximity fuse as defined in claim 17 wherein said transmitting-receiving means are adjustable to allow the same to transmit at at least two frequencies, wherein said amplifier channels are correlated to said frequencies, respectively, so that each amplifier channel will amplify only those Doppler frequency signals which are received when said transmitting-receiving means transmit at a particular one of said frequencies, and wherein said switchover means are additionally connected to said transmittingreceiving means and alternately cause (1) said transmittingreceiving means to transmit at one of the two frequencies and connect the corresponding amplifier channel to the output of said transmitting-receiving means and (2) said transmittingreceiving means to transmit at the other of the two frequencies and connect the other corresponding amplifier channel to the output of said transmitting-receiving means.

20. A Doppler frequency responsive electronic proximity fuse comprising, in combination:

a means for transmitting a high frequency signal and for receiving Doppler frequency signals which are reflected by a target, said transmitting-receiving means being adjustable to allow the same to transmit at at least two frequencies;

b means forming at least two amplifier channels which are correlated to said frequencies, respectively, so that each amplifier channel will amplify only those Doppler frequency signals which are received when said transmitting-receiving means transmit at a particular one of said frequencies;

c switch-over means connected to said amplifier channels for alternately connecting the same to said transmittingreceiving means, said switch-over means being additionally connected to said transmitting-receiving means and alternately cause (1) said transmitting-receiving means to transmit at one of the two frequencies and connect the corresponding amplifier channel to the output of said transmitting-receiving means, and (2) said transmitting-receiving means to transmit at the other of the two frequencies and connect the other corresponding amplifier channel to the output of said transmitting-receiving means; and d output circuit means connected to the outputs of said amplifier channels for producing a triggering signal only when the output signals produced by said two amplifier channels fulfill predetermined conditions.

21. A proximity fuse as defined in claim 20 wherein one of said amplifier channels incorporates a time delay member and wherein said output circuit means comprises a phase discriminator stage which produces said triggering signal only when the Doppler frequency signals amplified in said channels are of the opposite phase.

22. A proximity fuse as defined in claim 20 wherein said output circuit is a coincidence circuit and wherein each of said amplifier channels includes an integrating stage and a threshold stage connected to the output of said integrating stage, so that each amplifier channel applies a signal to said coincidence circuit only when the integrated Doppler frequency signal being amplified by the respective channel means exceeds a predetermined minimum amplitude.

* * * * *